Patented May 27, 1930

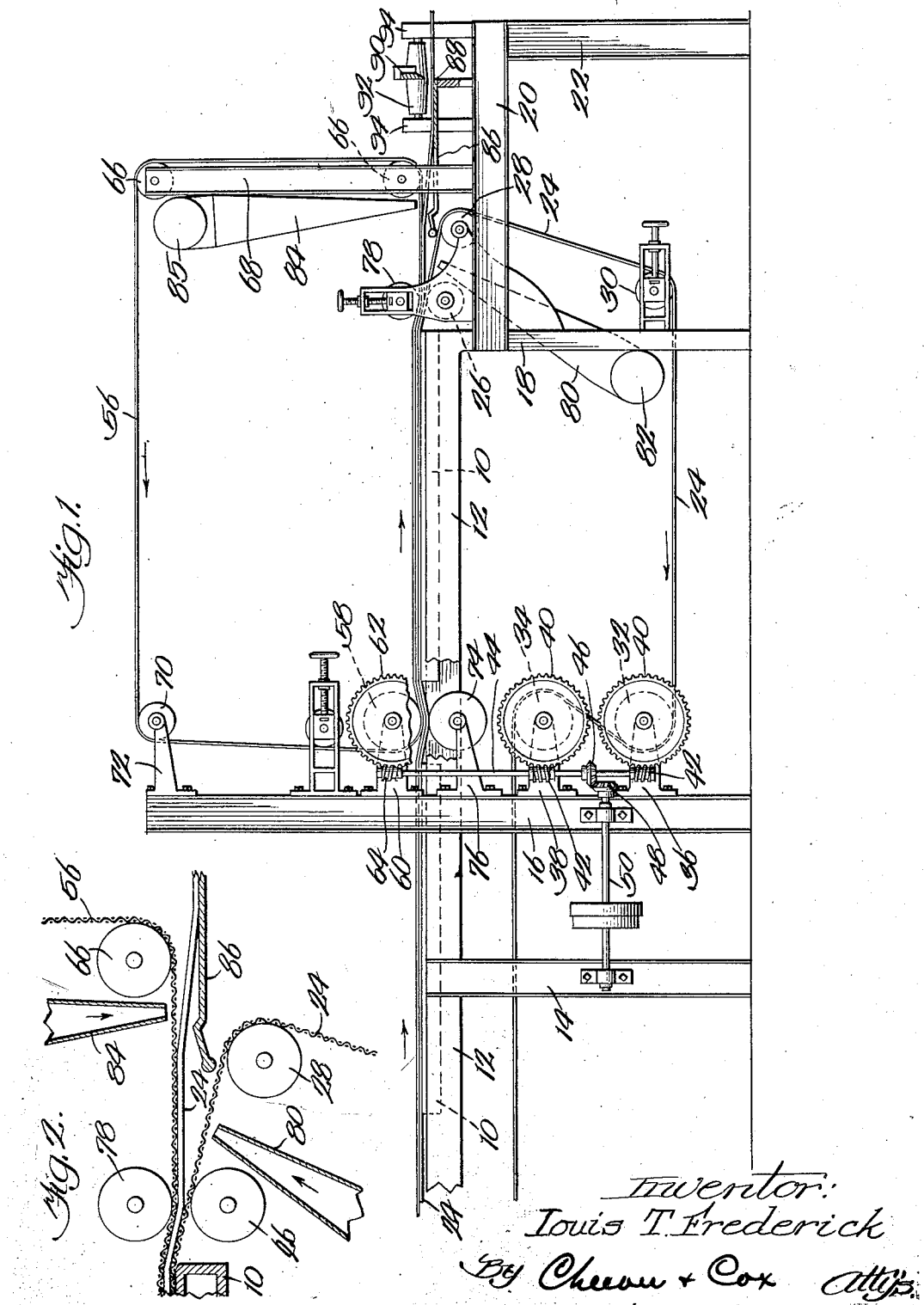

1,760,233

UNITED STATES PATENT OFFICE

LOUIS T. FREDERICK, OF VALPARAISO, INDIANA, ASSIGNOR, BY MESNE ASSIGNMENTS, TO CHICAGO MICA COMPANY, OF VALPARAISO, INDIANA, A CORPORATION OF INDIANA

MICA-LAYING MACHINE

Application filed June 1, 1925. Serial No. 34,079.

My invention relates to machines for producing sheet mica or mica plate and like commodities. Sheet mica is a well known commodity and consists of mica flakes or laminæ superposed upon each other in overlapping relation and bound together by shellac or other adhesive. Sheet mica may be made by depositing the flakes upon a screen, applying the adhesive, then removing from the screen and putting between platens of a hot press. But in this process there is a tendency for the work material to stick to the screen, and one of the objects of my invention is to provide efficient and practical means for separating the work material from the screen.

As above stated, according to the usual procedure, after the mica flakes have been laid with the adhesive in place the work material is introduced into a hot press in which the flakes and binder are consolidated so as to form a hard, unitary sheet used for insulating and other purposes. This may be termed a multistage process— not a continuous one— and the object of my invention is to provide a machine which will be continuous in its operation. In carrying out this idea I provide means for assembling the mica flakes and adhesive on a moving carrier, and means for heating and pressing the assembled materials while on this carrier. One of the objects of the invention is to provide practical means for carrying this into effect. In my machine I provide a pair of traveling screens, one of which supports the assembled materials and the other overlies them, and pass the two screens with the material confined between them between rollers which will exert the necessary pressure. One of my objects is thus to provide a machine having means for applying heat and pressure as part of a continuous process and means for preventing the material from sticking to the heating and pressing means. Another object is to provide means for subsequently separating the work material from the screens after it has been subjected to the pressing and heating process. Still another object is to provide means for cutting the material into lengths as it leaves the machine.

I accomplish my objects by the mechanism illustrated in the accompanying drawings in which Figure 1 is a side elevation of a complete machine but without showing any mechanical means for assembling the mica plates and adhesive, which step in the process may be accomplished by hand if desired.

Figure 2 is a side elevation partly in section showing on an enlarged scale the means for separating the work sheet from the traveling screens.

Like numerals denote like parts in the two views.

In the form illustrated the machine has a frame work comprising two tables 10 supported in side frames 12 which rest upon legs 14, 16, 18. A supplemental frame 20 is carried partially upon the legs 18 and partially upon the legs 22.

Traveling across the tops of the tables 10 is a lower screen 24 in the form of an endless belt or carrier. It passes around various guide rollers including the rollers 26, 28, 30, 32, 34 and one or more other rollers (not shown) located at the receiving end of the machine, that is, the left end when viewed as in Figure 1.

The rollers 32 and 34 are designed for traction purposes, that is, to cause the lower screen or carrier belt to travel. They are journaled in brackets 36, 38 carried on the legs 16 and are driven by worm gears 40 which mesh with worms 42 secured to a worm shaft 44. This shaft is driven by any suitable means, for example, a bevel gear 46 which meshes with a bevel gear 48 secured to a power shaft 50.

The upper screen or carrier belt 56 is also of the endless variety. It passes under a presser roller 58 journaled in brackets 60 secured to the upright members 16. This roller is heated in any suitable manner and is rotated by a worm gear 62 meshing with a worm 64 secured to shaft 44. The screen also passes around guide rollers 66 mounted horizontally in standards 68 rising from the supplemental frame members 20. It also passes around a guide roller 70 journaled in brackets 72 carried by the upright members 16.

Beneath the presser roller 58 is a companion presser roller 74 journaled in brackets 76 on the upright members 16.

At the delivery end of the table 10 is a guide roller 78 which lies above roller 26 and permits the two screens with the work sheet between to pass between them.

Now referring to the means for separating the work sheet from the screens: as the lower screen 24 leaves the roller 26 it passes obliquely downward to the roller 28. Between these two rollers there is a nozzle 80 which extends the entire width of the screens. At the bottom this nozzle is connected to a tube 82 by which air under pressure is blown out of the nozzle and against the under side of the lower screen. The air pressure is sufficient to force the work sheet 24 up off the screen; at least the air blast materially assists in this operation, although the action may be assisted by the upper screen 56 to which the material adheres to a greater or less extent at this point.

Between the overlying guide rollers 78, 66 there is a nozzle 84 which directs a blast of air downward against the top of the upper screen and against the top of the work sheet. This nozzle is also of the full width of the screen so as to insure complete separation of the work sheet from the screen. It is supplied with air under pressure by a pipe 85 which like the pipe 82 is connected with an air compressor or blower (not shown).

An apron 86 underlies the work sheet at this point and forms a support for it after it has been removed from the upper screen as shown in detail in Figure 2. This apron extends for an appreciable distance toward the delivery end of the machine, at which point it is desirable to provide a straight edge 88 which cooperates with a knife 90 for cutting the finished sheet into lengths. While the construction of the knife may be varied I have shown it mounted upon a rock shaft 92 journaled in two uprights 94 as shown at the right end of Figure 1. In practice the component parts of the work sheet are assembled at the receiving end of the machine, that is, toward the left of Figure 1. Mechanical elements may be employed for the purpose or the assembling may be done by hand. Both methods are known and hence for the present purpose it will be sufficient to say that as the lower screen 24 approaches the rollers 58, 74 the constituents of the work sheet have been assembled, the mica flakes lying upon each other in overlapped relation and being supplied with the adhesive. As the lower screen and the work sheet come to the presser rollers 58, 74 the upper screen 56 descends onto the work sheet, then passes between the two heated presser rollers, at which point the requisite pressure is exerted. After leaving the presser rollers the two screens with the work sheet between pass onto the second section of the table 10, which if desired may be hollow to enable it to be heated by steam or other medium. Upon leaving the table the two screens and interleaved work sheet pass between the two rollers 26, 78 which may or may not exert a final pressure, depending upon the will of the operator. As the screens leave the rollers 26, 78 they gradually diverge and this fact assisted by the air blast from the lower nozzle 80 insures separation from the lower screen. The work sheet is then separated from the upper screen by the upper nozzle 84 which directs a blast of air downward and forces the material to leave the upper screen and ride upon the apron. When a sufficient length of work sheet has passed the knife 90 the operator causes it to descend and sever that portion of the work sheet which has passed beyond it.

From the above description it will be evident that in my machine the work sheet is produced by a continuous process and that no handling of the material is required after the elements, that is, the mica flakes and adhesive are assembled. The employment of the upper screen 56 makes it possible to exert a continuous rolling pressure upon the traveling work sheet and makes it possible to separate the sheet from the acting mechanical elements after it has been compressed, consolidated and dried to the desired degree. The exertion of the pressure and the separation of the work sheet from the mechanical elements is not only continuous but it is automatic and the work sheet doesn't have to be cut into lengths as an intermediate step in the manufacture of the article. The cutting is reserved until after the sheet assumes its final form, when it is hard and tough and can be handled without any particular care.

Having thus described my invention what I claim as new and desire to secure by Letters Patent is:

1. In a machine for making sheet mica, a foraminous screen for supporting the work material, means for pressing the work material while on the screen to form a sheet, and means for forcing a fluid against the back of the screen and against the sheet for forcing the sheet away from the screen.

2. In a machine for making sheet mica, a pair of endless screens for supporting the work material between them, means for causing the screens to pass approximately tangentially to each other, means for causing the belts to travel in unison, means on opposite sides of the screens at the adjacent portions thereof for exerting pressure against the screen to form the work into a sheet, and means for directing an air blast against the back of the screens for forcing the sheets away from them.

3. In a machine for making sheet mica, a pair of endless foraminous screens traveling adjacent to each other for a portion of their travel, for holding the work material between them, means for subsequently causing said screens to diverge from each other, and means located beyond the point of divergence for directing a blast of fluid against the outer surface of the screen to thereby force the work material from the screen.

4. In a machine for making sheet mica and the like, a traveling screen for supporting the work sheet, and means for directing a current of air against the screen on the side opposite to the work sheet for separating it from the screen.

5. In a machine of the class described, a traveling screen for supporting the work sheet, means for compressing the work sheet while in contact with the screen, and means on the side of the screen opposite to the work sheet for directing a blast of air against the work sheet for separating it from the screen.

6. In a machine of the class described a pair of screens traveling in proximity to each other for holding composite material between them, opposed rollers for exerting pressure simultaneously against the back of the screens to compress the work material, means for causing the rollers and screens to move at the same speed, and means comprising a blast of fluid material for separating the work material from the screens.

7. In a machine for making sheet mica and the like, a pair of pressing rollers located approximately tangentially to each other, a pair of endless screen belts for confining the work material between them, means for causing said belts to pass between said rollers for compressing the work material, means for causing said belts to diverge after they have been pressed, and blowers at the diverging portions of the belts for blowing through them to separate the work material from them.

8. In a machine for making sheet mica and the like, a lower carrier for transporting the work material, an upper carrier for confining work material upon said lower carrier, opposed pressing rollers between which said carriers are guided, said rollers being arranged to compress the carriers together upon the work material, a heated zone arranged adjacent said rollers, means for guiding the work material through said heated zone and means for forcing a fluid against the back of said carrier to separate the work material from the carrier.

9. In an apparatus for making mica plate, a conveyor for carrying the mica, a screen overlying said conveyor and confining the mica flakes upon said conveyor, opposed heated pressing rollers between which said conveyor and said screen are guided, said rollers being adapted to compress the screen to the conveyor whereby to compact the flakes to form a mica plate, and means for forcing an air blast through said conveyor to separate the mica from the conveyor.

10. In a machine for making mica plate, a pair of endless carrier belts having portions extending adjacent each other and moving in unison whereby mica flakes may be confined between the belts and carried along thereby, heated pressure means between which the belts pass for pressing the belts together upon the work material arranged therebetween and means for stripping off the work material from the belts after the same have passed between the pressure means.

In witness whereof, I have hereunto subscribed my name.

LOUIS T. FREDERICK.